US008179820B2

(12) United States Patent
Chow et al.

(10) Patent No.: US 8,179,820 B2
(45) Date of Patent: *May 15, 2012

(54) ARCHITECTURE AND METHOD FOR USING IEEE 802.11-LIKE WIRELESS LAN SYSTEM TO EMULATE PRIVATE LAND MOBILE RADIO SYSTEM (PLMRS) RADIO SERVICE

(75) Inventors: Albert T. Chow, Hillsdale, NJ (US); Robert Raymond Miller, II, Convent Station, NJ (US); John F. Murray, Denville, NJ (US); Christopher W Rice, Parsippany, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/088,756

(22) Filed: Apr. 18, 2011

(65) Prior Publication Data

US 2011/0194481 A1    Aug. 11, 2011

Related U.S. Application Data

(63) Continuation of application No. 11/928,409, filed on Oct. 30, 2007, now Pat. No. 7,933,225, which is a continuation of application No. 10/207,702, filed on Jul. 26, 2002, now Pat. No. 7,307,963.

(60) Provisional application No. 60/309,956, filed on Aug. 30, 2001.

(51) Int. Cl.
*H04L 12/16* (2006.01)
*H04L 12/66* (2006.01)
*H04Q 7/24* (2006.01)

(52) U.S. Cl. ........ 370/259; 370/310; 370/338; 370/353; 370/390; 370/401; 370/432; 379/88.17; 379/201.01

(58) Field of Classification Search .................. None
See application file for complete search history.

(56) References Cited

U.S. PATENT DOCUMENTS

| | | |
|---|---|---|
| 4,815,128 A | 3/1989 | Malek |
| 5,913,176 A | 6/1999 | Barabash |
| 5,953,400 A | 9/1999 | Rosenthal |
| 6,185,430 B1 | 2/2001 | Yee et al. |
| 6,360,093 B1 | 3/2002 | Ross et al. |
| 6,366,771 B1 | 4/2002 | Angle et al. |
| 6,421,714 B1 | 7/2002 | Rai et al. |
| 6,477,150 B1 | 11/2002 | Maggenti et al. |
| 6,522,881 B1 | 2/2003 | Feder et al. |
| 6,560,456 B1* | 5/2003 | Lohtia et al. .......... 455/445 |
| 6,580,704 B1 | 6/2003 | Wellig et al. |
| 6,611,510 B2 | 8/2003 | Marples et al. |
| 6,701,361 B1 | 3/2004 | Meier |

(Continued)

*Primary Examiner* — Seema S Rao
*Assistant Examiner* — Christine Duong

(57) ABSTRACT

An architecture is described for providing IP push-to-talk (IPP2T) service using a wireless local area network (WLAN) serving a plurality of subscriber terminals (STs), having at least one broadband access network terminal (BANT), the BANT coupled to and interacting with at least one of a plurality of Access Points (APs) via a local area network (LAN), the plurality of APs in communication with the plurality of subscriber terminals; a multicast-enabled network, the multicast-enabled network coupled to and interacting with at least one BANT via a broadband access network; an IP network coupled to, and interacting with, the multicast-enabled network via an edge router; and a WLAN mobile radio service (WLMRS) controller (WLMRSC) coupled to and interacting with the IP network via a multicast-enabled router (MR).

20 Claims, 8 Drawing Sheets

U.S. PATENT DOCUMENTS

| | | |
|---|---|---|
| 6,738,639 B1 | 5/2004 | Gosselin |
| 6,788,946 B2 | 9/2004 | Winchell et al. |
| 6,829,486 B2 | 12/2004 | McKenna et al. |
| 6,862,622 B2 | 3/2005 | Jorgensen |
| 6,925,074 B1 | 8/2005 | Vikberg et al. |
| 6,961,575 B2 | 11/2005 | Stanforth |
| 6,970,926 B1 | 11/2005 | Needham et al. |
| 6,996,410 B2 | 2/2006 | Bos et al. |
| 6,996,414 B2 | 2/2006 | Vishwanathan et al. |
| 7,002,995 B2 | 2/2006 | Chow et al. |
| 7,006,472 B1 * | 2/2006 | Immonen et al. ............. 370/332 |
| 7,010,002 B2 | 3/2006 | Chow et al. |
| 7,031,287 B1 | 4/2006 | Ho et al. |
| 7,039,027 B2 | 5/2006 | Bridgelall |
| 7,058,042 B2 | 6/2006 | Bontempi et al. |
| 7,072,366 B2 | 7/2006 | Parkkinen et al. |
| 7,167,486 B2 | 1/2007 | Cornelius et al. |
| 7,170,863 B1 | 1/2007 | Denman et al. |
| 7,307,963 B2 * | 12/2007 | Chow et al. ................... 370/259 |
| 7,502,626 B1 | 3/2009 | Lemilainen |
| 7,606,261 B2 * | 10/2009 | Salovuori ..................... 370/466 |
| 7,738,407 B2 * | 6/2010 | Chow et al. .................. 370/259 |
| 7,792,935 B2 | 9/2010 | Karjanlahti |
| 7,801,953 B1 | 9/2010 | Denman et al. |
| 7,826,603 B1 | 11/2010 | Denman et al. |
| 7,933,225 B2 * | 4/2011 | Chow et al. ................... 370/259 |
| 7,948,923 B2 | 5/2011 | Chow et al. |
| 7,948,954 B1 | 5/2011 | Chow et al. |
| 2001/0024953 A1 | 9/2001 | Balogh |
| 2002/0009199 A1 | 1/2002 | Ala-Laurila et al. |
| 2002/0075844 A1 | 6/2002 | Hagen |
| 2002/0141386 A1 | 10/2002 | Minert et al. |
| 2002/0147008 A1 | 10/2002 | Kallio |
| 2002/0150091 A1 * | 10/2002 | Lopponen et al. ............ 370/389 |
| 2002/0159418 A1 | 10/2002 | Rudnick et al. |
| 2002/0173272 A1 | 11/2002 | Liang et al. |
| 2002/0191572 A1 | 12/2002 | Weinstein et al. |
| 2002/0196781 A1 | 12/2002 | Salovuori |
| 2003/0012149 A1 | 1/2003 | Maggenti et al. |
| 2003/0012183 A1 | 1/2003 | Butler et al. |
| 2003/0161296 A1 | 8/2003 | Butler et al. |
| 2005/0101245 A1 | 5/2005 | Ahmavaara |
| 2010/0303033 A1 * | 12/2010 | Shahar et al. ................. 370/329 |

* cited by examiner

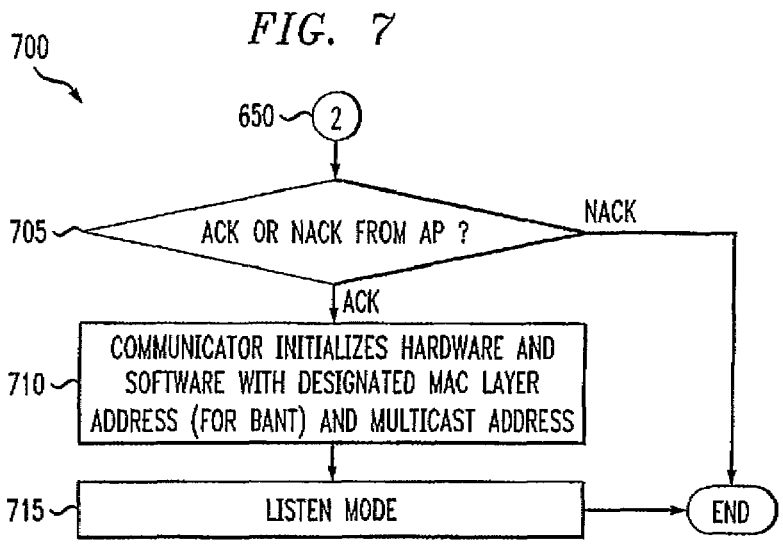
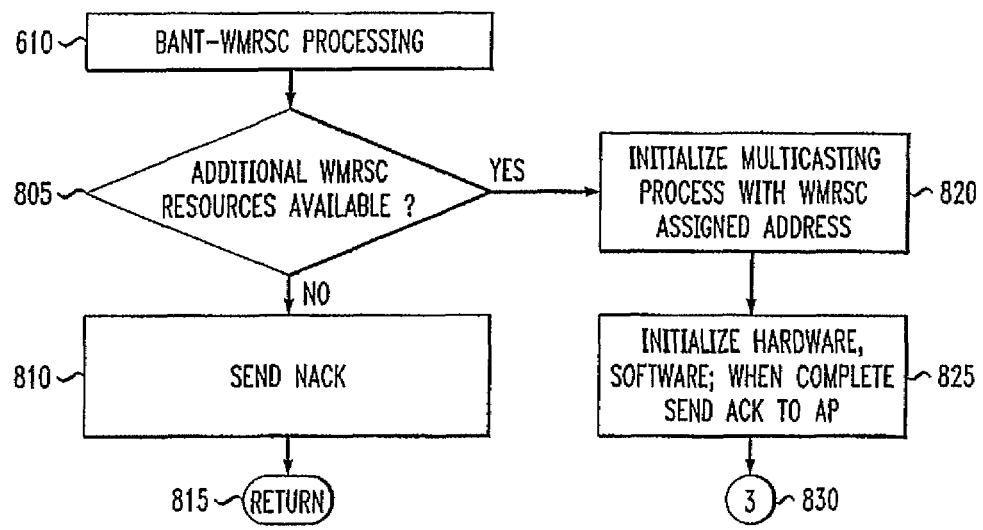

ARCHITECTURE AND METHOD FOR USING IEEE 802.11-LIKE WIRELESS LAN SYSTEM TO EMULATE PRIVATE LAND MOBILE RADIO SYSTEM (PLMRS) RADIO SERVICE

This application is a continuation of U.S. application Ser. No. 11/928,409, filed Oct. 30, 2007, now U.S. Pat. No. 7,933,225B2, which is a continuation application of U.S. application Ser. No. 10/207,702, filed Jul. 26, 2002, now U.S. Pat. No. 7,307,963 B2 which claims priority under 35 USC §119 (e) to U.S. provisional patent application ser. no. 60/309,956, filed on Aug. 3, 2001, the contents of each of the above cited applications is herein incorporated by reference in their entirety.

This present application is related to U.S. application Ser. No. 10/207,681, entitled, "Method and Apparatus for Delivering IPP2T (IP-Push-to-Talk) Wireless LAN Mobile Radio Service", now U.S. Pat. No. 7,738,407 by Albert T. Chow et al., filed Jul. 26, 2002, the contents of which is incorporated herein by reference in its entirety.

FIELD OF TECHNOLOGY

The present invention relates generally to the area of mobile telecommunications. More particularly, the present invention also relates to an architecture and method by which a wireless local area network (WLAN) provides an IP push-to-talk (IPP2T) service. Moreover, the present invention relates to the area of emulation of conventional push-to-talk devices so that private person-to-person and person-to-group communications can be handled and supported by an IPP2T network.

BACKGROUND

Private Land Mobile Radio Service (PLMRS) is widely used by private user groups such as businesses and public service organizations for general-use portable operations such as dispatch, coordination and emergency radio communications. Corporations frequently utilize these systems for on-premises and campus activity coordination such as allowing building maintenance, security or medical teams to remain in communication during normal or extraordinary circumstances. Radios are usually hand-held units and are frequently attached to the user's belt via a holster. Some applications, such as shipping area electric-carts, hi-lift inventory management, or golf cart-like electric personnel movers, are fitted with dash-mounted units.

The essence of PLMRS is non-duplexed (simplex) spectrum usage for voice communication. That is, the same frequency channel is used for both directions of conversation, with a push-button switch being used to key the transmitter when an individual wishes to call another unit or respond conversationally. Additionally, all users of a common group in a PLMRS system share the same frequency channel.

Wireless LANs (WLANs), such as the IEEE 802.11 standard, are becoming popular in business environments as a means of allowing exchange of computer data between laptops and wired LAN systems. Such systems usually operate, like PLMRS, with both directions of transmission sharing the same radio resource, but communicate only non-time-bound data.

Recently, the rise of multimedia content on the Internet has provoked a desire for wireless LAN systems to provide support of time-bound packet streams in addition to asynchronous data bursts. Such streams may contain a variety of content such as audio, video, and telephony. In response to the need to support streaming operation, wireless (and wired) LAN-like transmission systems have recently moved toward adoption of protocols which provide Quality of Service (QoS). These protocols provide the ability to allocate portions of the WLAN radio resource (throughput) to individual streams. The protocols usually employ a form of packet reservation via scheduling to minimize delay and contention during transmission of the streaming data so as to provide a guaranteed level of QoS.

Further, as a result of the development of QoS protocols, for example "MediaPlex" an invention of AT&T Labs, it has become possible to provide voice telephony via wireless LANs. Voice telephony over wired LAN facilities, cable, DSL, and other broadband packet transmission systems is accomplished by a number of protocols such as H323, media gateway control protocol (MGCP), session initiation protocol (SIP), etc. The protocols are intended to provide full-duplex telephony over time-segmented, shared resource systems.

The present application is related to application Ser. No. 09/616,900, entitled "An Architectural Reference Model for QoS-Driven Wireless LANs", invented by I. M. Ho, and filed Jul. 14, 2000; to application Ser. No. 09/617,439, entitled "Centralized Contention and Reservation Request for QoS-Driven Wireless LANs" and to application Ser. No. 09/616,901, entitled "An In-Band QoS Signaling Reference Model for QoS-Driven Wireless LANs", invented by W. Lin and I.-M. Ho, and filed Jul. 14, 2000; to application Ser. No. 09/617,083, entitled "Virtual Streams for QoS-Driven Wireless LANs", invented by I.-M. Ho and W. Lin, and filed Jul. 14, 2000; to application Ser. No. 09/616,897, entitled "Admission Control for QoS-Driven Wireless LANs", invented by W. Lin and J.-M. Ho, and filed Jul. 14, 2000; to application Ser. No. 09/616,896, entitled "Frame Classification for QoS-Driven Wireless LANs", invented by I.-M. Ho and W. Lin, and filed Jul. 14, 2000; to application Ser. No. 09/617,493, entitled "Frame Scheduling for QoS-Driven Wireless LANs", invented by I.-M. Ho and W. Lin, and filed Jul. 14, 2000; to application Ser. No. 09/617,494, entitled "RSVP/SBM Based Down-Stream Session Setup, Modification, and Teardown for QoS-Driven Wireless LANs", invented by I.-M. Ho and W. Lin, and filed Jul. 14, 2000; to application Ser. No. 09/616,878, entitled "RSVP/SBM Based Up-Stream Session Setup, Modification, and Teardown for QoS-Driven Wireless LANs", invented by I.-M. Ho and W. Lin, and filed Jul. 14, 2000; to application Ser. No. 09/617,440, entitled "RSVP/SBM Based Side-Stream Session Setup, Modification, and Teardown for QoS-Driven Wireless LANs", invented by I.-M. Ho and W. Lin, and filed Jul. 14, 2000; to application Ser. No. 09/616,885, entitled "Enhanced Channel Access Mechanisms for QoS-Driven Wireless LANs", invented by J. M. Ho and W. Lin, and filed Jul. 14, 2000; to application Ser. No. 09/617,439, entitled "Centralized Contention And Reservation Request For QoS-Driven Wireless LANs", invented by I-M Ho et al., and filed Jul. 14, 2000; and to application Ser. No. 09/616,884, entitled "Multipoll for QoS-Driven Wireless LANs", invented by J.-M. Ho and W. Lin, and filed Jul. 14, 2000; each of which is incorporated by reference herein as to their entire contents. The present application is also related to application Ser. No. 09/880,827, entitled "Broadband Network With Enterprise Wireless Communication System For Residential And Business Environment", filed Oct. 1, 2001 and application Ser. No. 09/881,111, entitled "Broadband Network With Enterprise Wireless Communication Method For Residential And Business Environment", filed Oct. 1, 2001, each of which is incorporated herein by reference as to their entire contents.

Voice-over-IP (VoIP) systems using these protocols are beginning to appear as an alternative to conventional circuit-switched telephone networks such as PBX and Centrex. Using new QoS-enabled wireless LANs, it is possible to extend VoIP telephony via IEEE 802.11-like transmission systems to provide mobility. Using the new VoIP capability, businesses may utilize a combination of LAN and wireless LAN resources to augment or replace embedded circuit-switched telephony systems. Over the next decade, such replacements are anticipated to accelerate rapidly, due to a desire to minimize information technology (IT) expenditures by consigning all traffic to a single, unified transmission system. An advantage of wireless LANs with QoS is the ability to support phased migration to an all-LAN architecture by eliminating the need to rapidly convert all conventional phones to VoIP. Such a phased approach minimizes retraining of personnel as well as disturbance of operations during a cut-over.

The combination of computers and telephones also provides simplified user migration from conventional phones to VoIP with the use of the high-resolution touch-screen display. PDA-like instruments with high-resolution displays and touch screens are becoming more sophisticated and inexpensive and afford the opportunity to create an "image" of the keypad of the legacy phone on the new VoIP phone. Then, using a "soft" PBX or switch with appropriate software, it is possible to make the PDA emulate the particular legacy instrument with which users have developed comfort.

SUMMARY

The present invention described herein is for a novel and non-obvious service, which for the first time permits packet-based wireless LANs to emulate person-to-person and person-to-group communications representative of Private Land Mobile Radio Service (PLMRS) often called "push-to-talk" radio. PLMRS services are widely employed by private user groups, businesses and public service organizations for general-use portable operations such as dispatch, coordination, and emergency radio communications.

With the substantial use of PLMRS in businesses, it is desirable to provide a means by which this type of communication service, system, and an emulation of a push-to-talk (PTT) device is available. Availability of such a solution would make the WLAN/LAN network capable of replacing "push-to-talk" radios as well as conventional telephones. It would, of course, convert PLMRS operation to digital transmission as well, replacing and improving the analog PM operation commonly employed today. Such operation is entirely new in wireless LAN systems and is substantially different from conventional telephony processes.

The present invention described herein is for a system and method by which a wireless LAN may provide such capability. The present invention also contemplates an emulation of a PTT device. In a preferred embodiment, a PTT device is an IP-PTT (IPP2T). It is assumed that the wireless LAN is similar to that specified by IEEE 802.11, enhanced with a QoS protocol such as "MediaPlex". Neither 802.11 nor MediaPlex will be described herein, as other transmission systems capable of supporting TCP/IP and QoS could be substituted (e.g., DOCSIS). IEEE 802.11/MediaPlex is used in the following discussion as an illustration because it has several valuable properties and should not be considered as limiting the present invention to using Mediaplex. Among the valuable features supported by Mediaplex are:

Base Station/Client architecture for better QoS control;
Availability of "beacon" frames which provide system access information;
Ability to provide overlapping coverage of small cells which may emulate single large cell operation;
Increased frequency reuse; and
The ability to provide for communications on an individual basis or on a group basis, where the groups may be fused on a dynamic basis.

Because the PLMRS emulation operates on the same WLAN system used for data and VoIP telephony, it is possible to provide additional features not currently available in "push-to-talk" radios. Examples of additional features include but are not limited to software-switch phone-patch to the telephone network, data and short message service, pager emulation, location-specific features, automatic (invisible) registration and polling, high-strength encryption and phone inventory control.

It is, therefore, an object of the present invention to provide an architecture that provides IP push-to-talk (IPP2T) services over a wireless local area network (WLAN).

It is a further object of the present invention to provide a method for providing IPP2T services using a WLAN.

It is yet another object of the present invention to provide a wireless device capable of operating in a plurality of modes, including as an IPP2T subscriber terminal, as a voice over IP (VoIP) terminal or as a subscriber terminal, where IPP2T is the default mode and a VoIP call pre-empts the default mode of operation.

It is another object of the present invention to provide a method for a user of such a wireless device to select from among the modes of operation.

It is yet another object of the present invention to merge multiple channels to give the appearance of a shared resource, even though it is not actually a shared resource.

It is yet a further object of the present invention to emulate a push-to-talk device for use with a WLAN using an enhanced QoS protocol.

BRIEF DESCRIPTION OF THE DRAWINGS

The invention is best described with reference to the detailed description and the following figures, where:

FIG. 7 is a service flow diagram showing the continuation of processing from FIG. 6.

FIG. 8 is a service flow diagram of the BANT processing.

DETAILED DESCRIPTION

The emulation of "push-to-talk" radio services in an IP environment requires solution of two problems: merging of multiple voice channels to give the appearance of a shared radio resource, even though it is not actually shared, and emulating the coverage provided by one high-powered transmitter (one large-coverage cell) using an aggregation of contiguous smaller cells via WLAN access points connected to a wired LAN backbone. The second obstacle is identical to that of cellular telephone's "emulation" of an older mobile telephone service, Improved Mobile Telephone Service (IMTS), utilizing a network of smaller cells, frequency reuse, registration, a mobility database, and a trunking backbone to provide ubiquitous service over the same large area.

WLANs are currently building on frequency/time reuse and time-division duplexing combined with packet radio techniques, QoS protocols, mobile-IP and intelligent routers to accomplish the same function with smaller cells and simplex spectrum. For the purposes of this description, these elements will not be detailed, recognizing that they will be necessary to provide wireless VoIP telephone service. A useful characteristic of small-cell systems is that a user who associates with a particular access point (AP) implicitly communicates his or her location. The property can be useful for 'man-down', 911-like, or no response situations. Location information of the access point which receives the highest signal strength of a particular transmission, stored on the server, can be linked to a user information database and accessed by an administrator with appropriate privacy and security clearance. Communication between the WLAN and APs and the AP that handles a particular communication depends on a channel quality metric or radio resource availability.

Packet communication is, by nature, point-to-point, since packets are individually addressed to a specific recipient. Conventional PLMRS is an inherently broadcast service wherein communications from a user may be received by all users, and where addressing is implicit because the user group is known it priori. Variations on this service are so-called "fleet call" services, which allow many users to communicate one at a time with a dispatcher. Such systems may utilize tone call squelch or other means of individually alerting one user without the need to listen to communications meant for others. A variety of manufacturers and service providers supply PLMRS systems, employing both digital and analog transmission.

Figure 1:
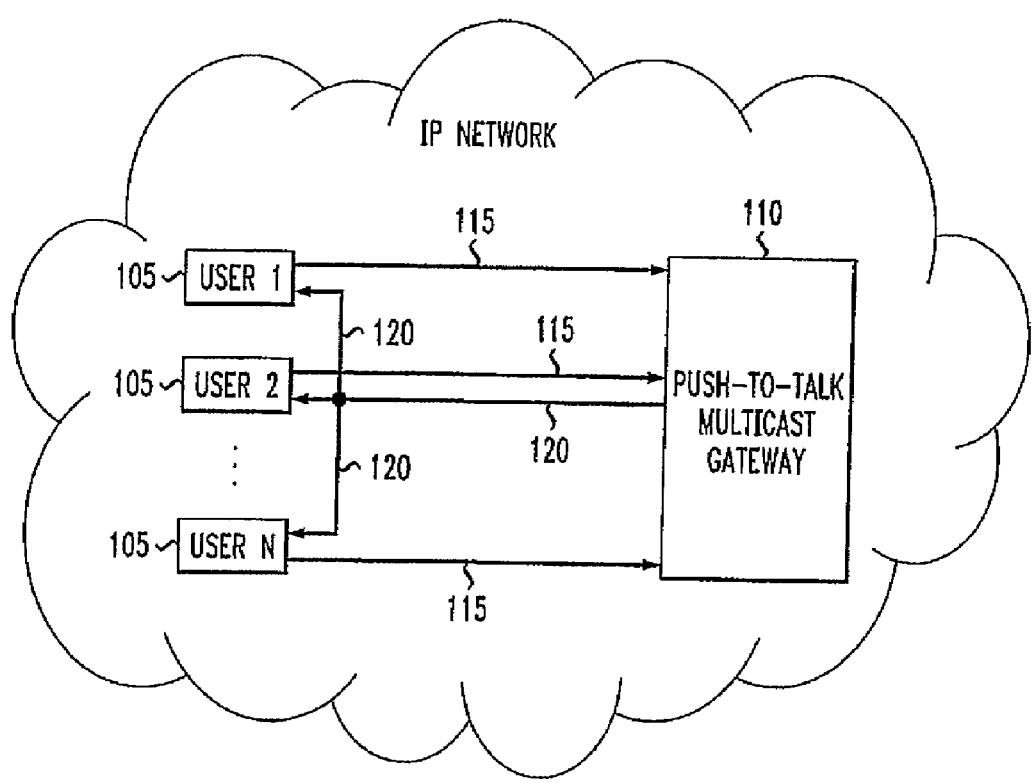
FIG. 1 is a high-level diagram of the multicast gateway of the present invention.

FIG. 1 is a high level diagram of the multicast gateway 110 of the present invention. The present invention extends packet/VoIP operation of wireless LANs to "IPP2T" service by causing emulated "push-to-talk" units to send packets to a multicast gateway, a new packet processing/routing device which may reside either in the packet network or within the local LAN domain of the users who will form the group of communicating individuals. The multicast gateway is programmed, for example, by secure web page interactions, so that it contains a list of known user packet addresses or other authentication qualifiers. The multicast gateway subsequently multiplexes each authenticated user's 105 packet voice stream 115, presented at its input, onto one or more output multicast streams 120. Each multicast stream 120 corresponds to a user group, which can consist of as little as two, or as many as the multiplexing capability of the server and capacity of the LAN allow. The "cloud" of FIG. 1 represents a network that encompasses the users 105 and the multicast gateway within the IP network conceptually. As will be seen and described below in FIG. 2, the users are in communication with access points (APs), which are each in communication with a broadband access network terminal (BANT). A BANT communicates with a multicast-enabled network via a broadband access network. A multicast-enabled network communicates with an IP network via an edge router and the IP network is in communication with a WLAN Mobile Radio Service (WLMRS) controller (WLMRSC) via a multicast-enabled router (MR).

An individual carrying an IEEE 802.11-equipped device may then listen to multicast stream(s) containing all current "transmitting" users' speech within the user group of which a particular user is a member. A user could simply "scroll" through available multicast channels corresponding to available user groups and push the "talk" button to add their voice to the conversation of the selected user group(s). A published arrangement of multicast channels could be instituted to facilitate use.

It should be noted that the architecture of the present invention allows considerable performance and versatility benefits compared to conventional PLMRS systems. In contrast to PLMRS, data conveyed by the service can be any form of multimedia, including voice, data, and video. For example, a building blueprint could be shared by one user with all other users instantaneously. This might be particularly useful to a maintenance group of a large building or to a fire-fighting unit to locate personnel in a burning building.

Unlike user-controlled multiplexing of conventional systems, simultaneous "keying" of user devices does not produce the undesirable artifacts which occur in radio systems—beat notes, unintelligibility of communication, etc.—as each user actually has a separate transmitted packet stream, which is separately decoded and combined with others before retransmission on the downstream multicast channel. To prevent "double talk", a feature could be added such that "keying" the microphone on a handset sends a message via the multicast channel which disables other microphone keys until that transmission is complete. The network server decides which user "wins" the channel, providing an "enforced etiquette".

Interference is also better controlled by the small-cell architecture of the WLAN embodiment of the present invention, ensuring better communication quality and boosting overall capacity. Since most PLMRS systems are analog, the digital voice coding (G.711, for example) provides superior voice quality and increased compatibility with trunking to other locations. High quality voice coding supports network-based voice recognition services as a security feature.

An important feature of the system is that users from widely separated locations can be multiplexed into a virtual IPP2T coverage area, which could include, for example, all security personnel in a corporate campus, all service-group buildings in an area or state, or even nationwide. User subgroups can also be formed and/or fused on a dynamic basis. Such sub-grouping can emulate PLMRS features such as selective-calling or tone squelch. For example, security and maintenance teams can be configured to have separate virtual PLMRS channels, but users on these "channels" can be unified under emergency conditions so that they may interoperate. Likewise, corporate security could monitor all user groups simultaneously while they operate independently among themselves.

Because the LAN-like architecture supports redundancy, reliability of the system is improved, since single points of failure (e.g., a single PLMRS base station covering a large area) are eliminated. Using QoS features present in the MediaPlex protocol, priority can be asserted, which enables emergency communication to supercede regular LAN traffic when required.

Since the system uses common WLAN infrastructure and client devices, strong encryption can be used to preserve the integrity of communications. The ability to set up secure channels based on network-based key management program provides a high degree of key control, e.g., log-in to a server, add your personal pin/key and become part of a secure group (similar to telephone conferencing systems). Since the manipulation of packets may be accomplished by software in client devices, these emulation devices can rapidly change from PLMRS emulation to conventional VoIP telephony, providing additional flexibility.

Because IPP2T utilizes the infrastructure of the WLAN, LAN, and packet backbone in common with voice, data, and streaming multimedia services, it is able to share the costs associated with these services. Since its operation is largely processing-dependent, it is well-suited as a network-based service so that the cost increment unique to the IPP2T service of the present invention may be shared over many users. Secondary communication services which might otherwise not be cost-effective could accordingly be accommodated in addition to VoIP telephony and IPP2T, including for example personal narration of exhibits in museums/galleries, person-to-person or family communication (e.g., "child finding" in malls), and waiting time/queue-position communication for theme parks, and restaurants. The IPP2T service of the present invention can also be used for location-specific information or "help" services, as no telephone number is required to access the resource.

There are several VoIP protocols which may be employed to implement IPP2T, including MGCP, SIP, MEGACO, etc. These protocols may be used either in a conferencing mode, where a network-based bridge sets up separate duplex links to each user in the group of communicating users similar to conventional telephony, or the service may be implemented using the multicast IP message method described above with a "mixer" to multiplex the separate upstream-only transmissions onto a common downstream channel heard by all. Those skilled in the art will recognize that the functions can be realized in a variety of ways.

Figure 2:
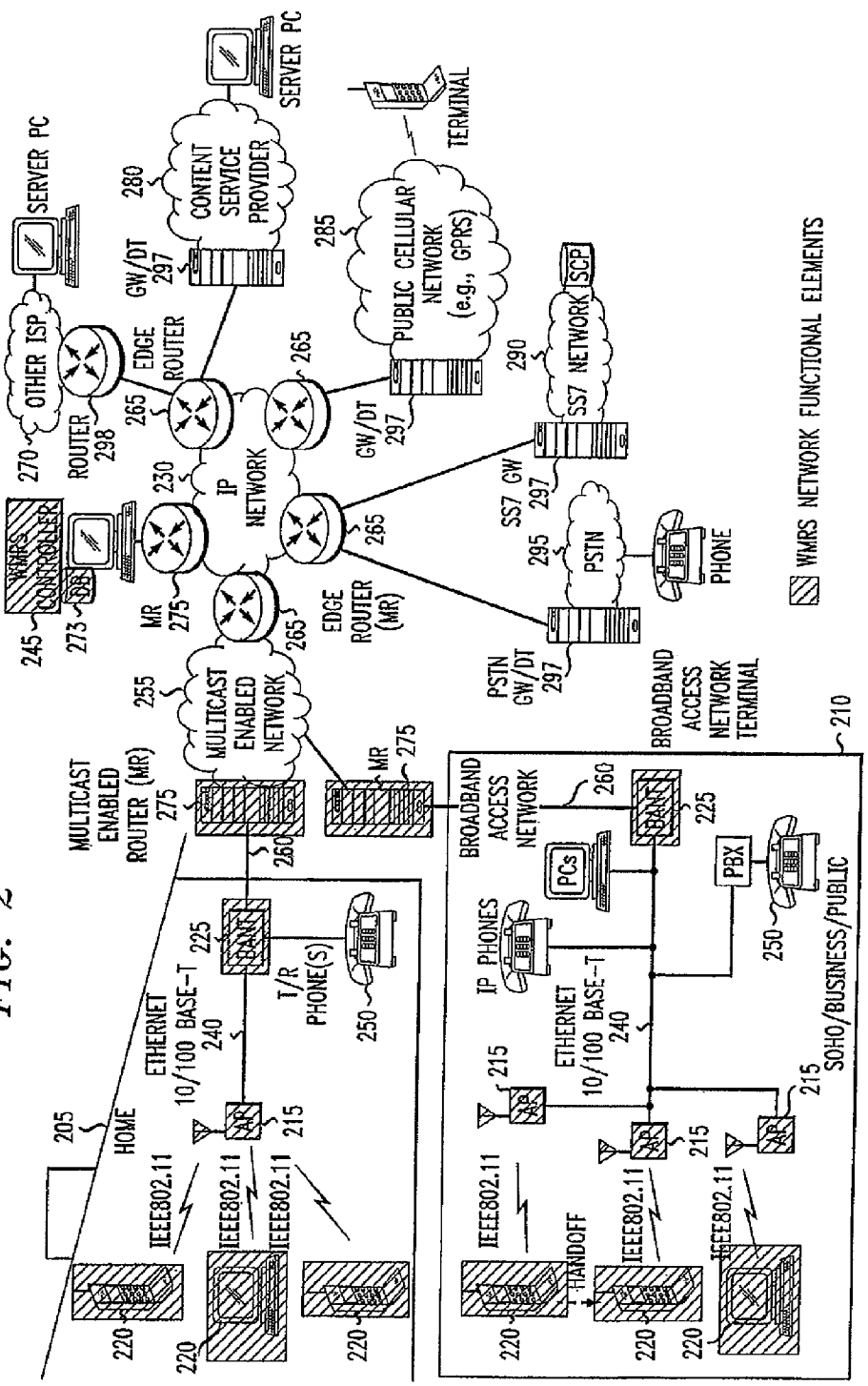
FIG. 2 is an exemplary WLAN Mobile Radio Services (WLMRS) architecture.

IPP2T service is within the context of an exemplary packet communication architecture as described herein. The wireless LAN mobile radio service (WLMRS) architecture as depicted in FIG. 2 is defined to support IPP2T application for home 205, neighborhood, small office home office (SOHO) 210, business 210 and public 210 environments. In an exemplary embodiment, the WLMRS architecture integrates the IEEE 802.111 Mediaplex-enabled access ports (APs) 215 and subscriber terminals 220, broadband access network terminal (BANT) 225 at home, SOHO and public environments and a IPP2T service provider WLMRS Controller (WLMRSC) 245 transparently into a service provider IP network 230.

FIG. 2 is an exemplary WLAN Mobile Radio Services (WLMRS) architecture. Specifically, FIG. 2 depicts a high-level WLMRS architecture with associated IPP2T required network functional elements. The IEEE 802.11 wireless subscriber terminals 220 interface to and interact with APs 215, which communicate with a BANT 225 via an Ethernet 10/100 base-T link 240. The subscriber terminals 220 can be in a home or neighborhood environment or in a SOHO, business or public environment. BANTs also interface with and interact with conventional wired line telephones 250. The BANT's interface to and interact with a multicast-enabled network 255 via a broadband access network 260. Multicast-enabled network 255 interfaces to and interacts with an IP network 230 via an edge router 265 in an exemplary embodiment. WLMRSC 245 interfaces to and interacts with the IP network 230 via a multicast-enabled router (MR) 275 in an exemplary embodiment. The WLMRSC is also in communication with a MR database (DB) 273, which maintains IPP2T subscriber personal and service profiles. The IP network 230 interfaces to and interacts with other ISPs 270, content service providers 280, public cellular networks 285, an SS7 network 290, and PSTN 295 via edge routers 265 at the IP network side and via network specific gateways and/or DTs 297 at the specific network side except for the other ISPs, which interfaces to and interacts with the IP network via a router 298. The WLMRS network functional elements include the STs, the APs, the BANTs, the WLMRSC, the multicast-enabled routers (MRs) and the database (DB). The air interface between the STs and the APs is over a WLAN. It is contemplated that the AP and BANT in the residential environment may be combined into a single AP/BANT device.

IP multicast addressing uses Class D IP addresses (i.e., 224.0.0.0 to 239.255.255.255) as specified by IETF RFC 1112. Each BANT is assigned a Class D IP address during service initialization processes performed by the WLMRSC. The Class D IP address is passed to the subtending APs and STs by the BANT during IPP2T service initiation to define a multicast group.

In order to provide network-centric IPP2T services at home, SOHO and public environments with the QoS, the network functions associated with the IPP2T are distributed strategically towards network functional elements located at the edge of the services provider IP network as follows:

Mediaplex-enabled IEEE 802.11 subscriber terminal (ST) 220—the ST can be any wireless terminal (e.g., VoIP phone, PDA etc.) that supports IEEE 802.11 with Mediaplex functions enabled and it provides the following key functions associated with IPP2T:

Support multicasting process as standardized by Internet Engineering Task Force (IETF) Request for Comment (RFC) 1112.

Support IEEE 802.11 Common Air interfaces (CAI) with Mediaplex capabilities.

Support user interfaces related to the IPP2T service launch, Voice over IP (VoIP) telephony and data mode of service.

Support information (i.e., voice, data and IPP2T) exchange between APs, BANT and WLMRSC via IEEE 802.11 CAI and a service provider IP network.

Support signaling and control information exchanged between APs, BANT and WLMRSC via IEEE 802.11 CAI and a service provider IP network.

Support mobility for terminal, personal and service management. The IPP2T service is rendered to all subscribers/member/communicators of a group anytime, anywhere and with any device including a telephone, PDA, LaptopIPC, etc. When a member of the IPP2T group travels, that member/subscriber (personal roaming) is enabled via subscriber registration to the WLMRSC from a remote location. For example, when a roaming IPP2T subscriber turns on his/her communication device at a local BANT, the local BANT proceeds to register the IPP2T subscriber as a "roamer" (user out of his or her normal operating area) and forwards the registration to the WLMRSC together with a temporary IP address. The WLMRSC informs the subscriber's home BANT to complete the registration process. The home BANT processes the IPP2T information to/from the remote BANT to complete the service based on the temporary IP address.

Support authentication, authorization and accounting (AAA) services and associated network control and signaling exchange based on IETF RFC 2865 Remote Authentication Dial-In User Service (RADIUS) Standard.

Support calls and features application via standard IP network protocols including SIP, MGCP, etc.

Support sending/receiving multicast applications associated with User datagram Protocol (UDP), Internet Protocol (IP), Internet Control Message Protocol (ICMP) and Internet Group Management Protocol (IGMP).

Support related network interface card (NIC) and drivers that will filter IPP2T related link layer and network IP layer multicast addresses.

Mediaplex-enabled IEEE 802.11 Access Ports (APs) 215—the AP is a WLAN device that provides interworking functions to the subtending STs via Mediaplex enabled IEEE 802.11 CAI. The APs connect directly to the wire LAN (e.g., 10/100 base-T Ethernet) for access to the BANT and in turn to WLMRSC to support integrated voice, data, multimedia and IPP2T services. The APs provide the following key functions associated with the IPP2T services:

Support multicasting process as standardized by IETF RFC 1112.

Support multicast routing functions related to IPP2T services.

Support IEEE 802.11 operation with Mediaplex QoS capabilities.

Support IPP2T service launch, Voice over IP (VoIP) telephony and data mode of services.

Support information (i.e., voice, data, multimedia and IPP2T) exchange between APs, BANT and WLMRSC via IEEE 802.11 CAI and a service provider IP network.

Support signaling and control information exchanged between APs, BANT and WLMRSC via IEEE 802.11 CAI and a service provider IP network.

Support mobility for terminal, personal and services management. The IPP2T service is rendered to all subscribers/member/communicators of a group anytime, anywhere and with any device including a telephone, PDA, Laptop/PC, etc. When a member of the IPP2T group travels, that member/subscriber (personal roaming) is enabled via subscriber registration to the WLMRSC from a remote location. For example, when a roaming IPP2T subscriber turns on his/her communication device at a local BANT, the local BANT proceeds to register the IPP2T subscriber as a roamer and forwards the registration to the WLMRSC together with a temporary IP address. The WLMRSC informs the subscriber's home BANT to complete the registration process. The home BANT processes the IPP2T information to/from the remote BANT to complete the service based on the temporary IP address.

Support authentication, authorization and accounting (AAA) services and associated network control and signaling exchange based on IETF RFC 2865 RADIUS Standard.

Support calls and features application via standard IP network protocols including SIP, MGCP, etc.

Support RF and radio management processes related to IPP2T services.

Support OAM&P processes related to IPP2T services.

Support security management processes including subscriber authentication, data encryption for privacy when necessary for the IPP2T services.

Support wire LAN network interface and inter-working for information exchange associated with IPP2T service.

Support sending/receiving multicast applications associated with User datagram Protocol (UDP), Internet Protocol (IP), Internet Control Message Protocol (ICMP) and Internet Group Management Protocol (IGMP).

Support related network interface card (NIC) and drivers that will filter IPP2I related link layer and network IP layer multicast addresses.

BANT 225—the BANT can be any residential, SOHO, business and public environment service provider's broadband network access termination. Such devices may be capable of supporting xDSL, cable, fiber, fixed broadband, wireless, and free-space optical transmission systems (e.g., LMDS, MMDS, Free Space Optic, satellite, T1/DS1 etc.) operating under IP with link layer processes that support either Frame Relay, A TM with or without MPLS/VPN for best QoS. The BANT provides the following key functions associated with the IPP2T services:

Support multicasting processes as standardized by IETF RFC 1112.

Support multicasting routing functions related to IPP2T services.

Support IEEE 802.11 protocols with Mediaplex capabilities.

Support IPP2T service launch, Voice over IP (VoIP) telephony and data mode of services.

Support information (i.e., voice, data and IPP2T) exchange between APs and WLMRSC via LAN and a service provider IP network.

Support signaling and control information exchanged between APs and WLMRSC via LAN and a service provider IP network.

Support mobility for terminal, personal and services management. The IPP2T service is rendered to all subscribers/member/communicators of a group anytime, anywhere and with any device including a telephone, PDA, Laptop/PC, etc. When a member of the IPP2T group travels, that member/subscriber (personal roaming) is enabled via subscriber registration to the WLMRSC from a remote location. For example, when a roaming IPP2T subscriber turns on his/her communication device at a local BANT, the local BANT proceeds to register the IPP2T subscriber as a roamer and forwards the registration to the WLMRSC together with a temporary IP address. The WLMRSC informs the subscriber's home BANT to complete the registration process. The home BANT processes the IPP2T information to/from the remote BANT to complete the service based on the temporary IP address.

Support media stream mixing (e.g., digital speech stream combining) and multicasting of information associated with IPP2T services.

Support authentication, authorization and accounting (AAA) services and associated network control and signaling exchange based on IETF RF 2865 RADIUS Standard.

Support calls and features application via standard IP network protocols including SIP, MGCP, etc.

Support RF and radio management processes related to IPP2T services.

Support OAM&P processes related to IPP2T services.

Support security management processes including subscriber authentication, data encryption for privacy when necessary for the IPP2T services.

Support wire LAN network interface and inter-working for information exchange associated to IPP2T service.

Support inter-working functions with other BANT and WLMRSC for IPP2T associated services, user data and signaling command control information exchange.

Support sending/receiving multicast applications associated with User datagram Protocol (UDP), Internet Protocol (IP), Internet Control Message Protocol (ICMP) and Internet Group Management Protocol (IGMP).

Support related network interface card (NIC) and drivers that will filter IPP2T related link layer and network IP layer multicast addresses.

Support firewall that permits IP multicast traffic.

WLMRSC 245—the WLMRSC is a server-based intelligent network service manager, which interworks with the subtending BANTs to support network centric IPP2T services. The WLMRSC provides the network management processing necessary to initiate IPP2T. The key network functions associated with the IPP2T services are:

Support multicasting processes as standardized by IETF RFC 1112.

Support multicasting routing functions related to IPP2T services.

Support system and subscriber database management related to the subscriber profile, IPP2T multicast team assignments, AAA, mobility, calls and features applications.

Support IPP2T service launch and initiation.

Support signaling and control information exchanged between APs and BANT via a service provider IP network.

Support mobility for personal and service management. The IPP2T service is rendered to all subscribers/member/communicators of a group anytime, anywhere and with any device including a telephone, PDA, Laptop/PC, etc. When a member of the IPP2T group travels, that member/subscriber (personal roaming) is enabled via subscriber registration to the WLMRSC from a remote location. For example, when a roaming IPP2T subscriber turns on his/her communication device at a local BANT, the local BANT proceeds to register the IPP2T subscriber as a roamer and forwards the registration to the WLMRSC together with a temporary IP address. The WLMRSC informs the subscriber's home BANT to complete the registration process. The home BANT processes the IPP2T information to/from the remote BANT to complete the service based on the temporary IP address.

Support authentication, authorization and accounting (AAA) services and associated network control and signaling exchange based on IETF RFC 2865 RADIUS standard.

Support calls and features application via standard IP network protocols including SIP, MGCP, etc.

Support RF and radio management processes with BANT related to IPP2I services.

Support OAM&P processes with BANT and APs related to IPP2I services.

Support security management processes including subscriber authentication, data encryption for privacy when necessary for the IPP2I services.

Support inter-working functions with other BANT and WLMRSC for IPP2I associated services, user data and signaling command control information exchange.

Support sending/receiving multicast applications associated with User datagram Protocol (UDP), Internet Protocol (IP), Internet Control Message Protocol (ICMP) and Internet Group Management Protocol (IGMP).

Support related network interface card (NIC) and drivers that will filter IPP2I related link layer and network IP layer multicast addresses.

Support firewall that permits IP multicast traffic.

Multicast-Enabled Router (MR)—the MR are intermediate routers that interface between the IP network and the WLMRSC and also interface between the BANTs and the Multicast-Enabled Network. The MR provides network functions as follows:

Support sending/receiving multicast applications associated with User datagram Protocol (UDP), Internet Protocol (IP), Internet Control Message Protocol (ICMP) and Internet Group Management Protocol (IGMP).

Support conventional IP information routing.

MR Database (DB)—the MR DB is associated with the WLMRSC and maintains IPP2T subscriber personal and service profiles.

Figure 3:
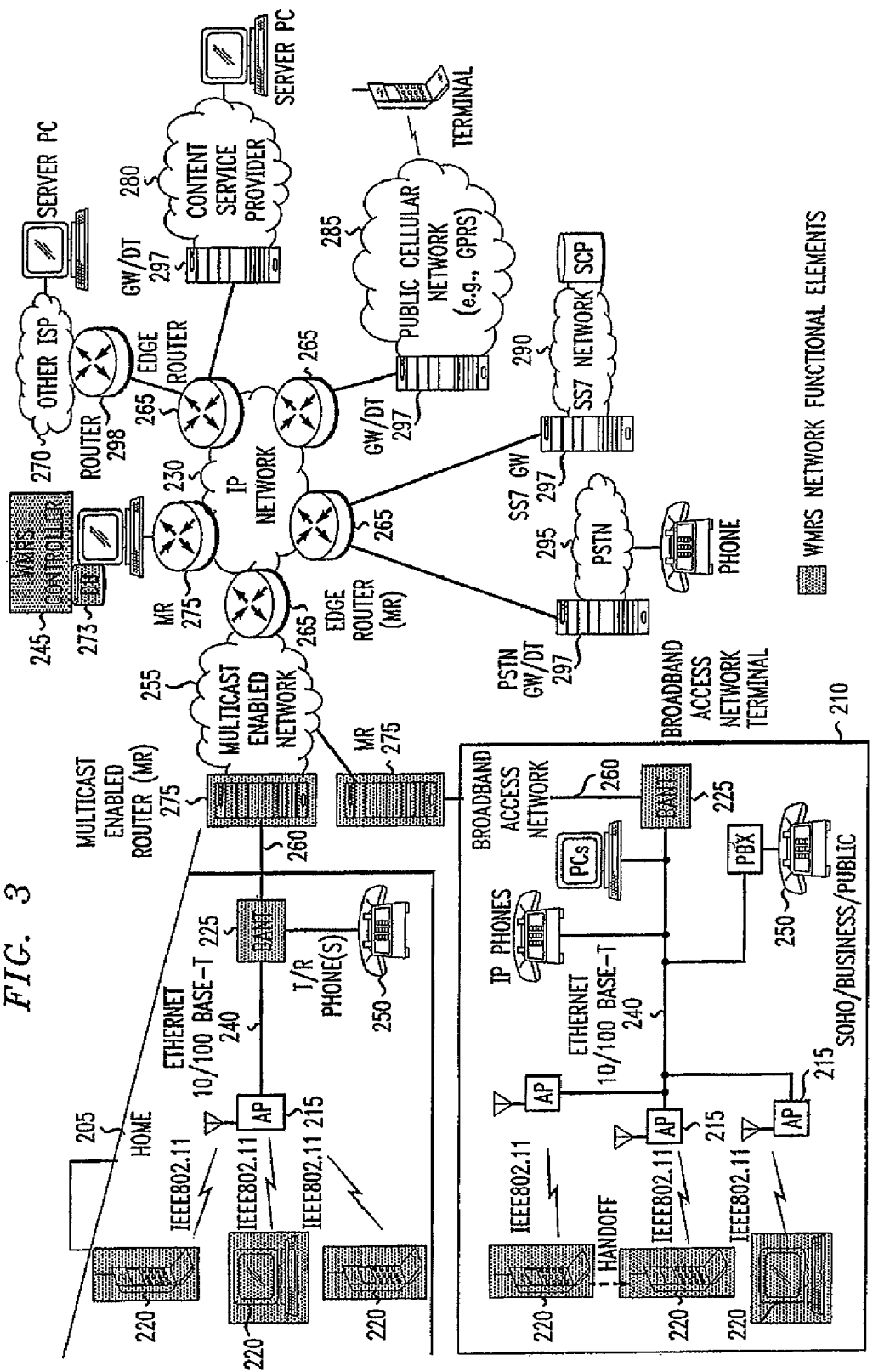
FIG. 3 depicts the associated IP "push-to-talk" (IPP2T) service provider network elements.

FIG. 3 depicts an exemplary architecture diagram of the present invention particularly pointing out the network elements (shaded) that belong to a IPP2T services provider. Specifically, the BANT, WLMRSC, MRs and DB are IPP2T network elements that form a part of the IP services provider network. FIG. 3 is otherwise the same as FIG. 2 including being labeled similarly. It should be noted that the BANT and the WLMRSC are also WLMRS network functional elements as well as being IPP2T network elements.

The BANT is designed to allow online/automatic update of IPP2T software for new services and applications from the WLMRSC to provide IPP2T as a part of service provider network IP-centric services.

To support IPP2T service, the AP, BANT and WLMRSC and associated networks must be IP multicast-enabled including intermediate routers (Multicast-enabled routers (MRs)). The IPP2T supports IP multicasting methodology as specified in IETF RFC 1112, which is also an extension of the standard IP network level protocol. IP multicasting transmits IP datagrams from a subscriber/communicator to the BANT and, in turn, to all listeners in a host group(s) identified by a single IP destination address. The datagrams or push-to-talk audio information from the subscriber or communicator is delivered to all listeners of a pre-registered destination group with the same "best-effort" reliability as regular unicast datagrams. The membership of an IPP2T group is dynamic. Members may join or leave the group at any time via the registration/de-registration process with the WLMRSC via the BANT. When a subscriber/member initiates a new IPP2T group, a new IP-multicasting address is assigned by the WLMRSC and, in turn, the BANT initializes services. There is no restriction on the location or number of members in an IPP2T group and each BANT may be a host for more than one IPP2T group. At the application level, a multicast address may support multiple data streams on different port numbers, on different sockets with one or more simultaneously operated applications including an on-going IPP2T session, video conferencing and/or broadcasting in a multimedia environment. The IPP2T may be operated on a Local Area Network (LAN) hosted via a BANT in a residential, SOHO, public and/or business environment or it may operate over a Wide Area Network (WAN) environment supported by intermediate routers (MRs) between different BANTs. For larger network or IPP2T application, additional WLMRSCs may be needed to support different service regions or zones. Therefore, WLMRSCs must have the capability to communicate with each other via TCP/IP for ease of supporting WAN-associated IPP2T subscriber roaming, member authentication, registration and subscriber database/profile management processes.

The IPP2T capable terminal (e.g., VoIP phone or PDA with IPP2T/IEEE 802.11/Mediaplex functions enabled) is designed to support the following modes of operations:

IPP2T only mode—when selected, the IPP2T is the default and only mode of operation.

IPP2T and VoIP mode—when selected the IPP2T will be the default mode of operation except the VoIP service supersedes the IPP2T service. When there is an incoming call, the IPP2T will be temporarily pre-empted to allow servicing of incoming VoIP call(s). The IPP2T will resume service at the end of the VoIP call.

VoIP mode—when selected, the VoIP is the default and only mode of operation.

Registration—subscriber requesting IPP2T service with registration process via BANT to WLMRSC. During registration, the WLMRSC authenticates the subscriber and then authorizes the services.

Figure 4:
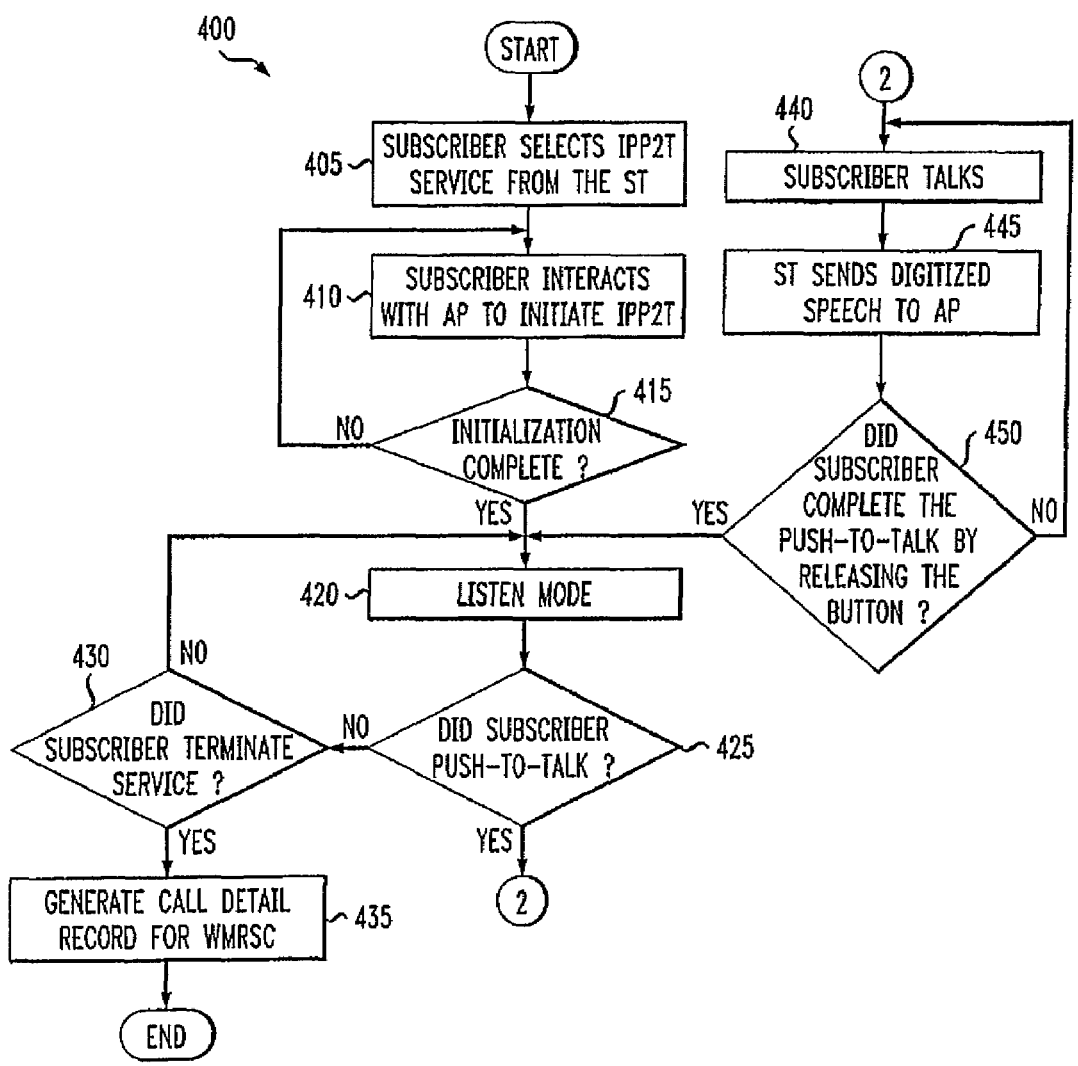
FIG. 4 depicts an exemplary process flow, where a subscriber initiates IPP2T service from the subscriber terminal.

FIG. 4 is a service flow diagram 400 that depicts the IPP2T only mode service scenarios as follows:

Subscriber selects IPP2T from ST's man-machine interface at 405.

At 410, the ST initiates IPP2T service via IP application layer protocols (e.g., SIP, MGCP, etc.) to the AP. AP in turn interworks with the BANT and WLMRSC to initialize the IPP2T service. If the WLMRSC validates the request from the ST, the AP will acknowledge the ST request and setup the IPP2T service. The ST then starts the IPP2T service and initializes the "listen-mode". The ST polls the AP and continues to keep communication with the AP open until it receives a response indicating that initialization is complete. At 415, initialization completion is tested. If initialization is not complete, execution at 410 continues. If initialization is complete, then "listen-mode" is initialized at 420.

While in "listen mode" at 420, the ST monitors testing to see if the subscriber initiates "push-to-talk" at 425. If the subscriber initiates "push-to-talk", then the subscriber using the ST talks at 440 and the ST forwards the digitized speech to the AP at 445. The ST is polled at 450 until it receives notification that the subscriber has released the push-to-talk button, at which time the ST returns to listen mode. If at 425 it is determined that the subscriber did not initiate "push-to-talk", then a determination is made at 430 if the subscriber terminated the IPP2T service. If service is terminated, then the ST goes back to previously pre-programmed default mode of operation. The BANT generates a call detail record (CDR) for WLMRSC at 435.

It should be clear that the push-to-talk button may be supplanted by an intelligent system that uses voice-operated transmission (VOX). This is a speakerphone-like feature that turns on the transmitter when the person holding the unit speaks. That is, the intelligent system could be essentially voice-activated. Further, a "soft" button activated by a finger or a stylus could be available on the PLMRS emulator—for example, a PDA. The "soft" button could perform almost the exact opposite function than a push-to-talk. That is, the "soft" button could operate as a "mute" button so that no unintentional conversations are broadcast. Most PDAs that might be used as emulators also emulate conventional "mouse" buttons which can also be used to emulate either push-to-talk or mute.

Figure 5:
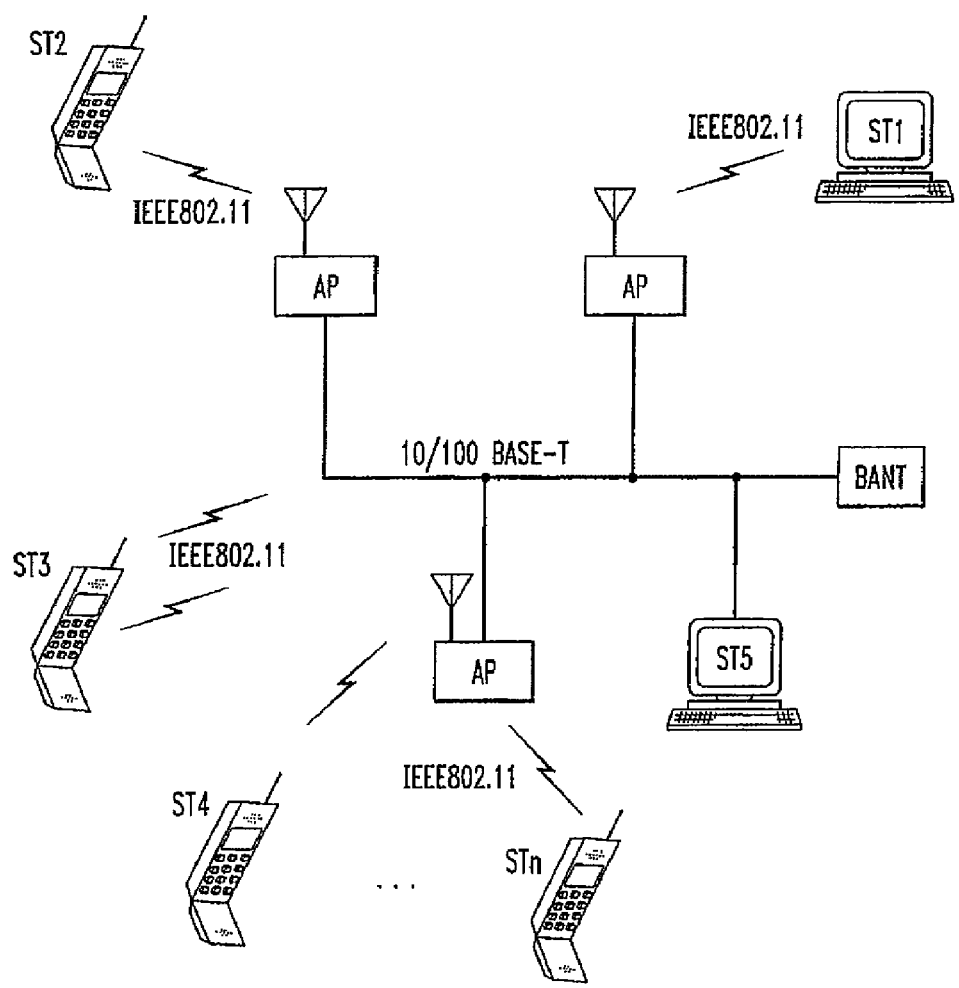
FIG. 5 depicts an exemplary scenario for broadband access network terminal (BANT) Multicasting of "push-to-talk" voice stream.

FIG. 5 depicts the IPP2T service scenarios. When the subscriber activates the push-to-talk button, the voice stream will be captured by the ST. The ST will digitize the captured speech and transport the digitized speech by Mediaplex-enabled IEEE 802.11 transmission to the AP. The AP, in turn, sends the digitized voice stream via a LAN to the BANT for processing. Normally, when an ST wishes to send packets, the packets are retransmitted to all other STs, including the one which initiated the transmission. Optionally, when a particular terminal depresses the push-to-talk button, the BANT may be configured to send that ST's voice stream to all STs having the same pre-assigned multicasting address, but not to the one which originated the transmission, since that one is assumed to be "talking". Likewise, the BANT sends the digitized voice stream only to those STs in the listen mode. A separate confirmation signal may be sent to the ST designated by the WLMRSC as the current "talker" to confirm that that user has obtained the communication resource. The confirmation signal may be used to provide positive indication to a user (via an LED for example), that he or she is "on the air." The function is similar to the "In-Use" indicator on cellular phones.

Figure 6:
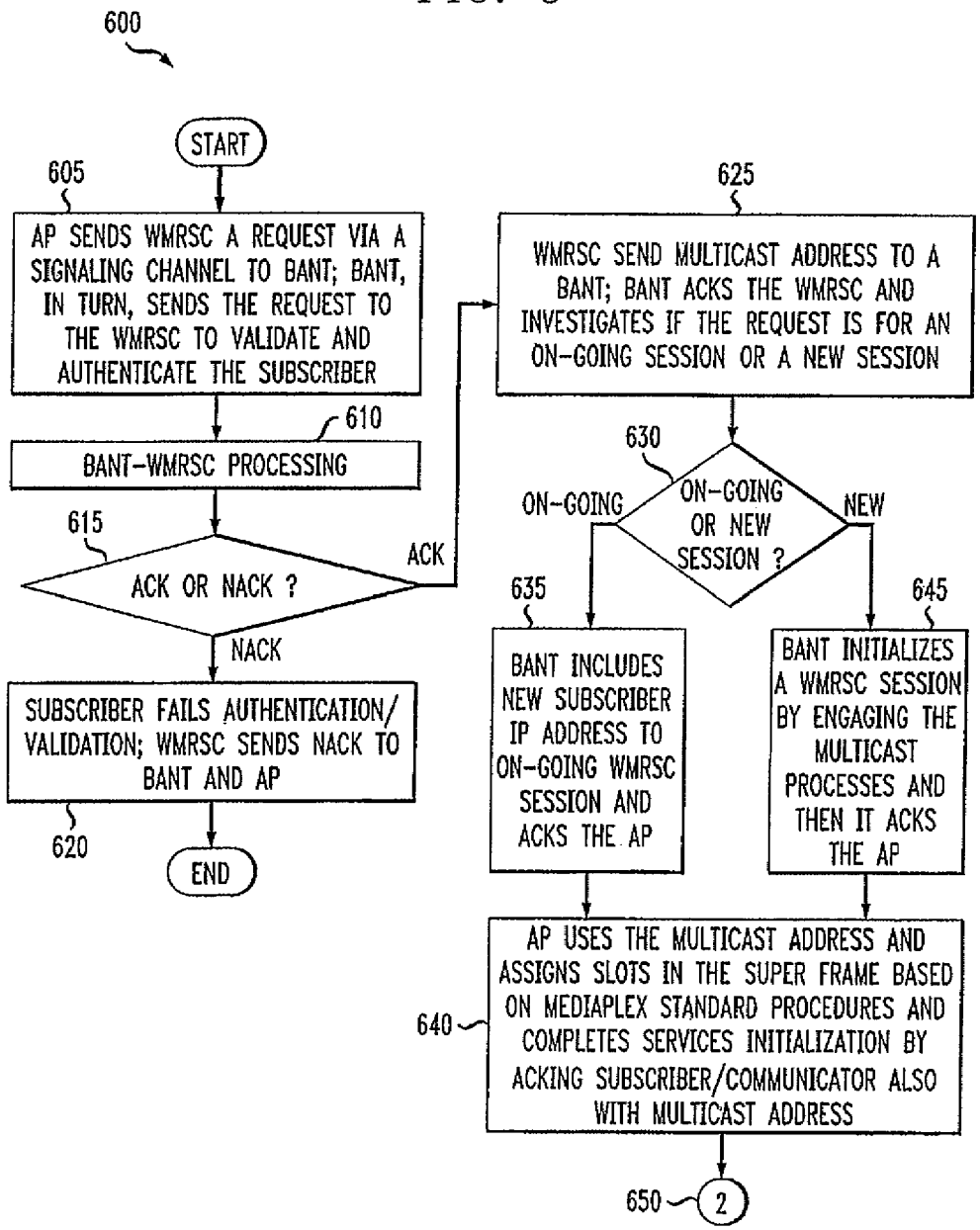
FIG. 6 is a service flow diagram showing AP and ST initialization.

FIG. 6 is a service flow diagram 600 showing AP and ST initialization for IPP2T service as follows:

An AP sends a request to validate and authenticate a subscriber via a signaling command to a BANT which in turn forwards the request to a WLMRSC. This initiates BANT-WLMRSC processing indicated by 610 and continued as on FIG. 8. A return value or indication is received by this routine in the form of an "ack" or "nack". The return indication is queried at 615; and if the return indication is a nack, then at 620 the subscriber is determined to have failed authentication/validation and a nack is sent back to the BANT and the AP and the routine/program terminates. If an ack is received as a return indication, then at 625 the WLMRSC sends a multicast address to the BANT and the BANT acks the WLMRSC and investigates if the request is for a new session or a session already in process (on-going session).

A determination is made at 630 with a query if the session is on-going or new. If the session is on-going, then at 635 the BANT includes the new subscriber's IP address to the WLMRSC session and acks the AP. At 640, the AP uses the multicast address and assigns slots in the super frame based on MediaPLex standard procedures and completes services initialization by asking the subscriber/communicator with the multicast address also. Processing continues in accordance with FIG. 7 and pointed to by continuation bubble 650. If the session is a new session, then at 645 the BANT initializes a WLMRSC session by engaging the multicast processes and then acks the AP. Processing then proceeds at 640 as described above.

FIG. 7 is a service flow diagram that shows the continuation of processing from 650 of FIG. 6. FIG. 7 depicts the AP process leading to a WLMRSC ack or nack as part of ST IPP2T services initiation request. A determination is made at 705 whether there has been an ack or nack from the AP. If there has been a nack, then processing ends. At 710, if there has been an ack, then the subscriber/communicator initializes hardware and software with the designated MAC layer address (for the BANT) and a multicast address. The IPP2T ST then goes into listen mode as indicated at 715 and the routine/program ends.

FIG. 8 is a service flow diagram 800 of the BANT—WLMRSC processing called at 610 on FIG. 6. FIG. 8 depicts the scenario that the WLMRSC validates the available network resources for serving the service request from the ST regardless of whether it is a new session or an on-going (already in process or add-on) session. A determination is made at 805 if additional WLMRSC resources are available. If additional WLMRSC resources are not available, then a nack is returned at 810 and this routine/program returns to the calling routine/program at 815. If additional WLMRSC resources are available, then the multicasting process is initialized with the WLMRSC assigned address at 820. At 825, hardware and software are initialized; and upon completion of this initialization, an ack is sent to the AP. Continuation bubble 830 indicates that processing continues at FIG. 9.

Figure 9:
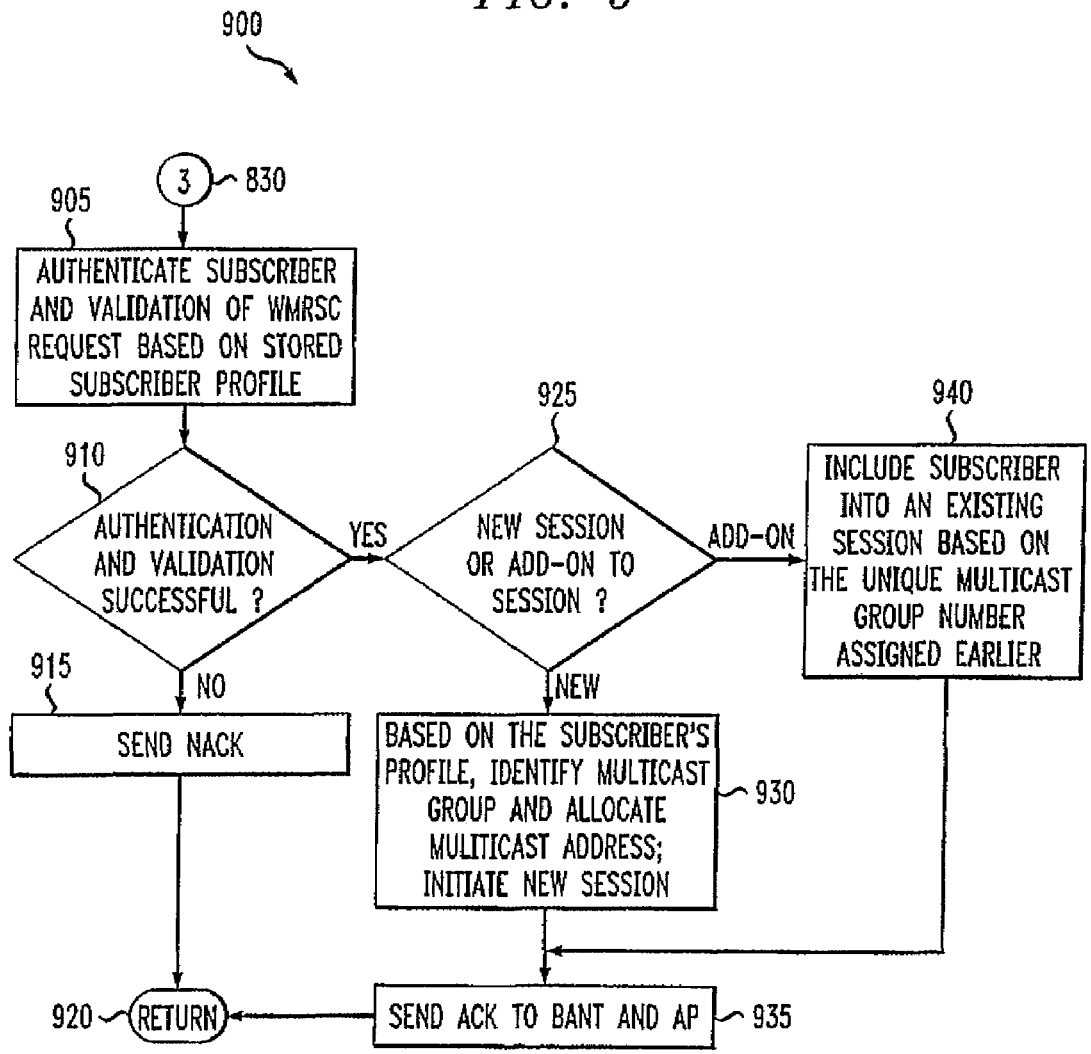
FIG. 9 is a service flow diagram showing the continuation of processing from FIG. 8.

FIG. 9 is a service flow diagram 900 and is a continuation of the processing of FIG. 8. FIG. 9 depicts the scenario where the WLMRSC authenticates a subscriber's service request. All authentication requests are performed in accordance with the IETF RFC 2865 RADIUS Standard. At 905, an attempt is made to authenticate a subscriber based on stored subscriber profile information. This process is in accordance with the IETF RFC 2865 RADIUS Standard. A determination is made at 910 if authentication/validation was successful. If authentication/validation was not successful, then a nack is indicated at 915 and this routine/program returns to the calling routine/program at 920. If authentication/validation was successful, then at 925 a determination is made if this is a new session or an on-going (already in process) session. If it is a new session, then at 930 a multicast group is identified based on the subscriber's profile and allocated a multicast address and a new session is initiated. At 935, an ack is sent to the BANT and the AP and this program then returns to the calling program at 920. If this is an on-going (already in process/add-on) session, then at 940 the subscriber is included into the existing session based on a unique multicast group number assigned earlier and an ack is sent to the BANI and the AP at 935.

It should be noted that any references to hardware or software can be interchanges and especially that application-specific integrated circuits (ASICs) and/or filed programmable gate arrays (FPGAs) may be substituted where appropriate.

It should be clear from the foregoing that the objectives of the invention have been met. While particular embodiments of the present invention have been described and illustrated, it should be noted that the invention is not limited thereto since modifications may be made by persons skilled in the art. The present application contemplates any and all modifications within the spirit and scope of the underlying invention disclosed and claimed herein.

What we claim is:

1. A system, comprising:
    a broadband access network terminal configured to interact with an access point;
    a multicast-enabled network configured to interact with the broadband access network terminal;
    an internet protocol network configured to interact with, the multicast-enabled network via an edge router; and
    a wireless local area network mobile radio service controller configured to interact with the internet protocol network via a multicast-enabled router.

2. The system of claim 1, wherein the internet protocol network is further configured to interact with a public switched telephone network via a public switched telephone network gateway.

3. The system of claim 1, wherein the internet protocol network is further configured to interact with an SS7 network via an SS7 gateway.

4. The system of claim 1, wherein the internet protocol network is further configured to interact with a public cellular network via a public cellular network gateway.

5. The system of claim 1, wherein the internet protocol network is further configured to interact with a content service provider via a content service provider gateway.

6. The system of claim 1, wherein the Internet protocol network is further configured to interact with an internet service provider via a router.

7. The system of claim 1, wherein the broadband access network terminal interacts with the access point via a local area network, wherein the local area network is Ethernet 10/100 base-T.

8. The system of claim 1, wherein the broadband access network terminal interacts with the access point via a wireless local area network.

9. The system of claim 8, wherein the wireless local area network uses a quality-of-service protocol.

10. The system of claim 1, wherein the broadband access network terminal interacts with the access point via a wireless local area network, wherein the wireless local area network utilizes a small-cell architecture.

11. A method comprising:
    receiving packetized information and control signaling from an access point at a broadband access network terminal;
    sending the packetized information and the control signaling from the broadband access network terminal to a multicast-enabled network via a broadband access network;
    routing the packetized information and the control signaling between the multicast-enabled network and an internet protocol network via an edge router; and
    directing the packetized information and the control signaling to a wireless local area network mobile radio system controller via a multicast-enabled router.

12. The method of claim 11, wherein the packetized information and control signaling are received from the access point at the broadband access network terminal via a local area network.

13. The method of claim 12, further comprising:
    sending the packetized information and control signaling over the air from the access point to a subscriber terminal via the local area network.

14. The method of claim 13, wherein the broadband access network terminal supports media stream mixing of the packetized information.

15. The method of claim 14, wherein the media stream mixing of the packetized information is associated with a push-to-talk service.

16. The method of claim 15, wherein the push-to-talk service comprises an internet protocol push to talk service.

17. The method of claim 13, wherein the broadband access network terminal supports multicasting of the packetized information.

18. The method of claim 17, wherein the multicasting of the packetized information is associated with a protocol push-to-talk service.

19. The method of claim 18, wherein the protocol push-to-talk service comprises an internet protocol push-to-talk service.

20. The method of claim 13, wherein the broadband access network terminal supports media stream mixing of the packetized information and multicasting of the packetized information.

* * * * *